US012570115B2

(12) United States Patent
Garner et al.

(10) Patent No.: US 12,570,115 B2
(45) Date of Patent: ***Mar. 10, 2026

(54) OFFSET MULTI-POINT UNDER BED HITCH MOUNTING SYSTEM AND METHOD

(71) Applicant: HORIZON GLOBAL AMERICAS INC., Plymouth, MI (US)

(72) Inventors: Kevin W. Garner, Swartz Creek, MI (US); Matthew J. Dunlavey, Ann Arbor, MI (US); Erik Fritz, New Boston, MI (US); Brian W. Ward, Swartz Creek, MI (US); Henry J. Guthard, Livonia, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 1224 days.

This patent is subject to a terminal disclaimer.

(21) Appl. No.: 17/417,146

(22) PCT Filed: Dec. 24, 2019

(86) PCT No.: PCT/US2019/068468
§ 371 (c)(1),
(2) Date: Jun. 22, 2021

(87) PCT Pub. No.: WO2020/139877
PCT Pub. Date: Jul. 2, 2020

(65) Prior Publication Data
US 2022/0072919 A1    Mar. 10, 2022

Related U.S. Application Data

(60) Provisional application No. 62/785,304, filed on Dec. 27, 2018.

(51) Int. Cl.
B60D 1/48 (2006.01)
B62D 33/02 (2006.01)
B62D 65/16 (2006.01)

(52) U.S. Cl.
CPC ............. B60D 1/485 (2013.01); B62D 33/02 (2013.01); B62D 65/16 (2013.01)

(58) Field of Classification Search
CPC ............ B62D 53/0828; B62D 33/0207; B60P 7/0815; B60P 7/0807; B60D 1/015; B60D 1/06; B60D 1/485; B60D 1/488
See application file for complete search history.

(56) References Cited

U.S. PATENT DOCUMENTS 3,837,675 A    9/1974  Barnes et al.
6,158,761 A  * 12/2000  King ..................... B60D 1/488
                                              280/495

(Continued)

OTHER PUBLICATIONS

Patent Cooperation Treaty (PCT), International Search Report and Written Opinion for Application PCT/US2019/068468 filed Dec. 24, 2019, mailed Mar. 4, 2020, International Searching Authority, US.

*Primary Examiner* — Christopher B Wehrly
(74) *Attorney, Agent, or Firm* — DAY PITNEY LLP; George N. Chaclas; Anthony A. Kassas

(57) ABSTRACT

An under bed hitch mounting apparatus is shown and described. The under bed hitch mounting apparatus may comprise a first bracket attachable to a frame of a vehicle below a load bed of the vehicle and a second bracket attachable to the frame of the vehicle below a load bed of the vehicle, the second bracket transversely spaced from the first bracket. The under bed hitch mounting apparatus may also include a first receiving member attached with the first bracket, the first receiving member configured to engage an accessory member, where at least a portion of the first (Continued)

120,220,
320,420 receiving member extends above the load bed of the vehicle, and a second receiving member attached with the second bracket, the first receiving member configured to engage the accessory member, where at least a portion of the second receiving member extends above the load bed of the vehicle.

14 Claims, 8 Drawing Sheets

(56) References Cited

U.S. PATENT DOCUMENTS

| | | | |
|---|---|---|---|
| 6,824,157 B1 | 11/2004 | Putnam | |
| 7,121,573 B2 * | 10/2006 | Lindenman | B62D 53/08 |
| | | | 280/433 |
| 7,793,968 B1 | 9/2010 | Withers | |
| 9,834,050 B2 * | 12/2017 | Stanifer | B62D 53/0828 |
| 10,322,612 B2 * | 6/2019 | McCoy | B60D 1/488 |
| 2015/0102584 A1 * | 4/2015 | Hartleip | B60D 1/015 |
| | | | 280/511 |
| 2016/0361961 A1 * | 12/2016 | McGory | B60D 1/485 |
| 2017/0182855 A1 * | 6/2017 | McCoy | B60D 1/015 |
| 2018/0250994 A1 | 9/2018 | Garner et al. | |

* cited by examiner 120,220,320

120,220,320

7

120,220,320

5

100,200,300

120,220,320

120,220,320

120,220,320

120,220,320

7

5

100,200,300

120,220,320

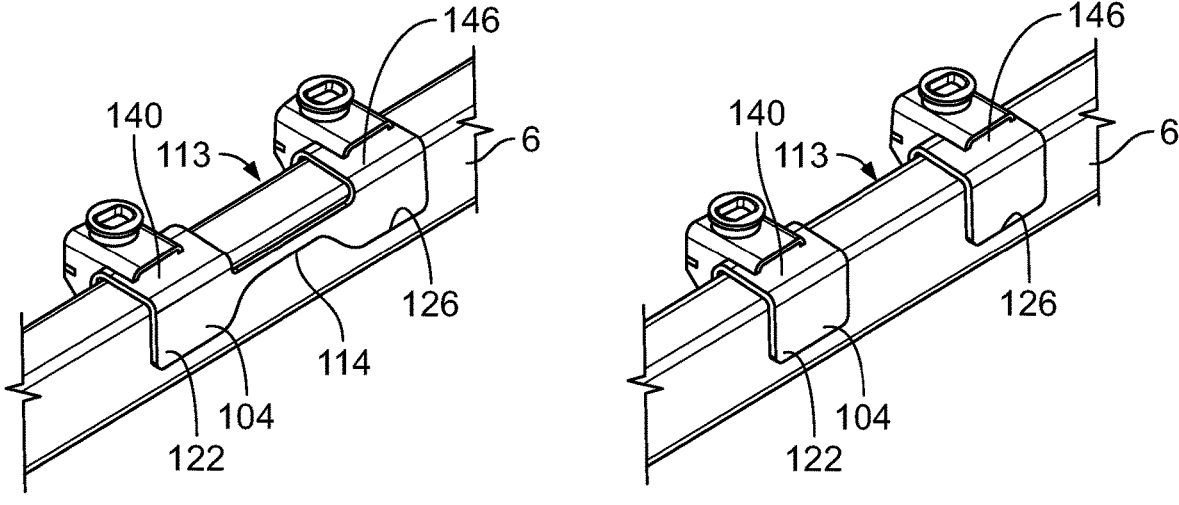
FIG. 3A                    FIG. 3B
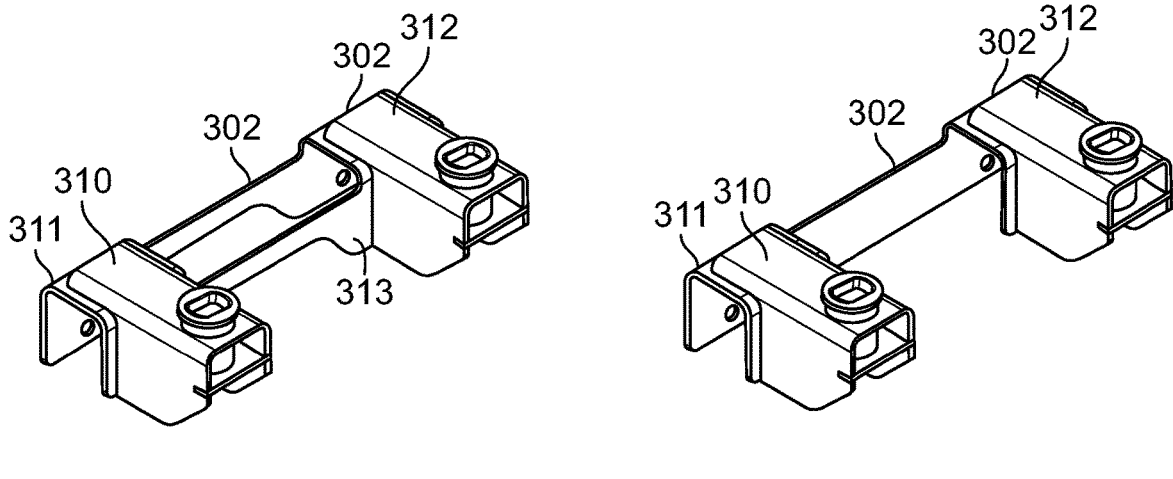
FIG. 4A                    FIG. 4B

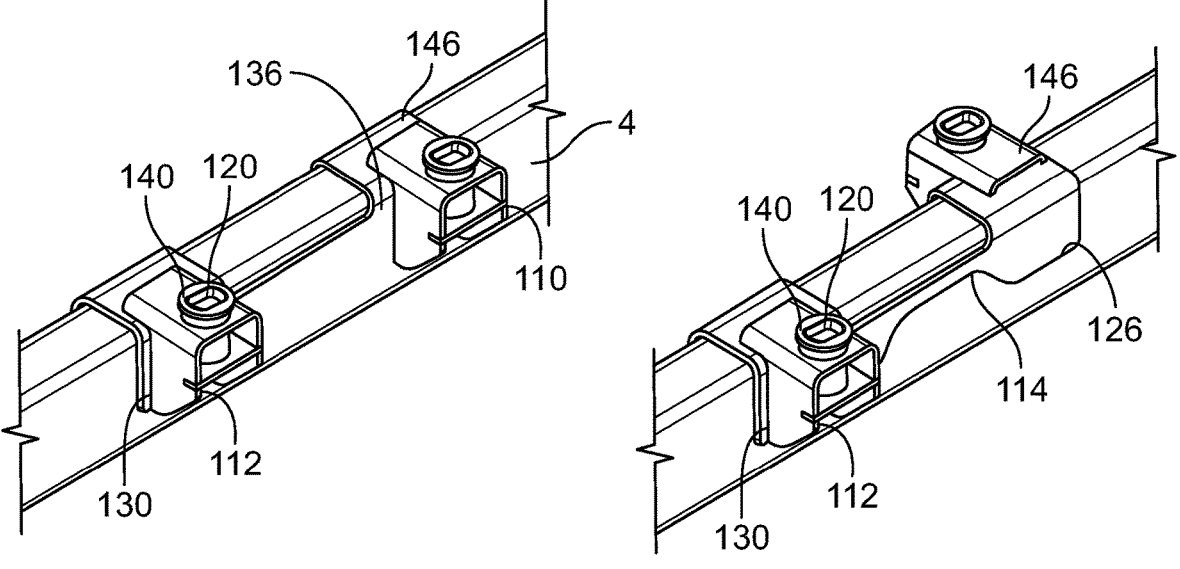
FIG. 5A          FIG. 5B
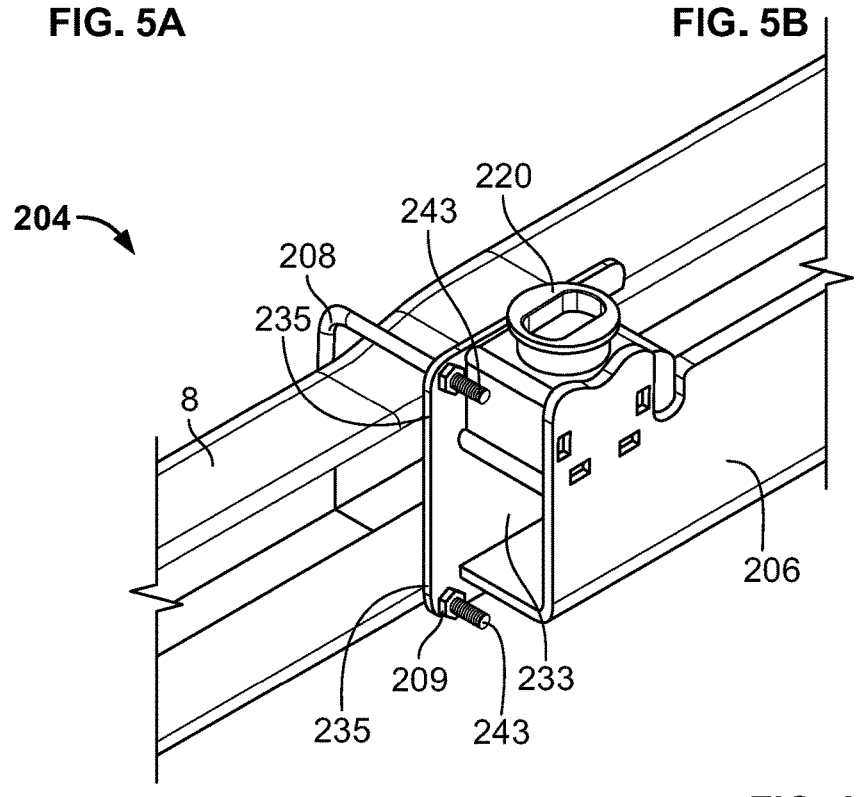
FIG. 6

OFFSET MULTI-POINT UNDER BED HITCH MOUNTING SYSTEM AND METHOD

CROSS REFERENCE TO RELATED APPLICATIONS

This application is a 35 U.S.C. 371 national stage filing of PCT Application No. PCT/US2019/068468 filed on Dec. 24, 2019 and entitled "OFFSET MULTI-POINT UNDER BED HITCH MOUNTING SYSTEM AND METHOD" which claims the benefit of and priority to U.S. Provisional Patent Application No. 62/785,304, filed on Dec. 27, 2018 each of which is are incorporated by reference in their entireties.

This application also incorporates by reference U.S. patent application Ser. No. 15/909,236, filed on Mar. 1, 2018, which itself claims priority to U.S. Provisional Patent Application Ser. No. 62/465,353, filed on Mar. 1, 2017, both of which are entitled "MULTI-POINT UNDERBED HITCH MOUNTING SYSTEM" and incorporated as if fully rewritten herein.

TECHNICAL FIELD

The present disclosure is generally related to a towing apparatus and, more particularly, to multi-point under bed hitch mounting system attachable to a frame of a towing vehicle.

BACKGROUND

Many vehicles are designed to transport freight, goods, merchandise, personal property, and other such cargo. Often, a hitch assembly is utilized to connect a towed vehicle or trailer to a towing vehicle, such as a truck for example, to increase the capacity to transport goods. Many types of coupling devices have been developed for providing this connection between a towing vehicle and a towed vehicle.

It is well known to utilize a trailer hitch to connect a trailer to a towing vehicle. There are many different types of trailer hitches that may be attached to the towing vehicle in a variety of ways, depending on the type of hitch to be used. Some of the most common types of hitches include gooseneck, fifth wheel, front mount, and the like. Often, the type of hitch used to connect a trailer and a vehicle is determined by the size, shape and other features of the trailer. For example, large trailers such as semi trailers and campers often require a fifth wheel hitch, whereas, small and mid-sized trailers, such as boat trailers, are better suited for gooseneck trailer hitches.

Due to the size and weight of many trailers, it is preferable to attempt to evenly balance and distribute the weight of the trailer over the wheels of the towing vehicle. This is best accomplished by connecting the hitch to the frame or base of the towing vehicle, near the vehicle's center of gravity.

Accordingly, hitches mounted to the load bed of trucks and other vehicles connect to the vehicle's frame. Generally speaking, past systems relied on single piece or parallel mounting permanently fixed to the underside of the vehicle. To ensure strength and stability, these frames spanned transversely across the underside of the vehicle to connect to the longitudinal rails of the frame. In particular, many mounting systems used parallel transverse rails, an H-shape member, or an integral single member. In all cases, these mounting systems attach to towing or other apparatus via one or more apertures formed in the load bed of the vehicle. Examples of such under-bed mounting connections can be found in U.S.

Pat. Nos. 7,793,968; 7,828,317; 8,414,009; 9,067,468; and 9,150,067 (all of which are incorporated by reference herein).

One disadvantage of disposing substantial portions of the mounting apparatus under the truck bed is that these systems are comparatively difficult to access and inspect (excepting, of course, for the connection point provided through the truck bed). Further, the use of stabilizing transverse cross members may add unwanted vehicle weight, a problem that becomes even more acute as vehicle manufacturers strive to improve upon fuel efficiency and materials' cost.

Another potential issue can be that the distance between the longitudinal rails of the frame may vary depending on the type of vehicle. In particular, the transverse distance between the frame members may vary from vehicle to vehicle, and some vehicles may utilize curving or C-shaped rails. In either instance, these arrangements may be amenable to incorporating single piece, integral mounts and/or conventional H-shaped mounts wherein the transverse legs have fixed distances and/or attachment points.

Further, the ancillary vehicle systems disposed proximate to the load bed (or other anticipated connection point for the mounting system) may impede the ability to use a standardized geometry. For example, exhaust or suspension systems, electrical or hydraulic lines, and other vehicle systems positioned by the original manufacturer may make it impossible to use a conventional mount that relies upon one or more transverse cross members. Even with systems that integrate onto the vehicle frame (like the invention noted in the cross reference above), the resultant rectangular geometry of the mounting points simply may not be feasible.

Yet another challenge is that hitch mounts and other systems that attach to these mounting systems often have very specific horizontal planar tolerances. Thus, if the vehicle load bed or the frame itself slopes (longitudinally and/or transversely), use of any of the systems described above may not be possible. Ultimately, existing vehicle structures including the frame, bed, cross-members, exhaust, and suspension systems may have generally rectangular patterns that would prevent a one piece fifth wheel under bed hitch structure that includes 4 pucks to be mounted thereon. The mounting systems typically have too many parts that can be difficult to assemble together and placed on the vehicle or the mounting systems may be incorrectly packaged from the manufacturer due to system complexities.

Further consideration is that underbed mounting systems need to be easy to install. As the number of parts grows, the complexity and likelihood for error and/or misplacement of those parts also grows. As such, a method to simplify these types of systems is needed.

In view of these shortcomings, a system and method that allow for a multi-point mounting system with increased flexibility, including the possibility of non-rectangular arrangements to accommodate varying vehicle/load bed considerations is needed. Further, a mounting system that is relatively simple is desired.

SUMMARY

A hitch mounting system relying on a pair of brackets to create an offset arrangement of connection points in the vehicle load bed is contemplated. As used herein, offset means that the four point connections are not spaced in a square or rectangular configuration. Instead, any other quadrilateral can be employed, with trapezoidal (where the wider end disposed at either the lead or trailing edge of the vehicle load bed) or a parallelogram configurations being preferred.

In any event, only two or fewer of the angles formed by the quadrilateral are right angles, with a pair of acute and obtuse angles utilized.

In one embodiment, a series of brackets may be attached to the vehicle frame by mounting over or completely around the structural members, depending upon whether the vehicle possesses a box frame or a C-frame. Each bracket comprises a plurality of mounting points that may accept quick disconnect direct-to-puck assemblies. The mounting points are disposed longitudinally from one another by a beam. The bracket may be formed from a completely or partially enclosed tube or beam with a polygonal transverse cross section including at least two, and preferably three or four, flat surfaces. At least one of the flat surfaces engages the longitudinal rails, with the longitudinal rails of box framed vehicles engaging three separate flattened surfaces. A C-shaped extension member may optionally be fastened to one of the vertically flat surfaces to serve as a connector to vehicles with C-frames.

In another embodiment, the direct puck connections may be formed within the vehicle's structural members itself. Here again, the arrangement of the connection points are arranged as noted above. A method of creating a connection system for a vehicle accessory or towing system is similarly contemplated.

In one embodiment, provided is an under bed mounting apparatus to create an offset arrangement of receiving members in the vehicle load bed. The apparatus may comprise a first bracket including a first receiving member positioned in a first mounting platform and a second receiving member positioned in a second mounting platform, wherein the first mounting platform and the second mounting platform are attachable to one another along a first plate member. A second bracket including at least one of a third receiving member positioned in a third mounting platform and a fourth receiving member positioned in a fourth mounting platform. The first bracket and the second bracket may be configured to be attached to a rail in a shaped arrangement wherein the first and second receiving members are configured in an offset or aligned configuration relative to the third or fourth receiving members. Said arrangement includes at least one of a triangle, square, rectangular, quadrilateral, trapezoid, and a parallelogram shaped configuration. The first and second brackets are attached to the vehicle frame by bolt, weld, or cast and wherein the brackets are at least mounted partially around the rails. The receiving members may include mounting points for a vehicle accessory. At least one of the first bracket and second bracket may be formed from a completely or partially enclosed tube or beam with a polygonal transverse cross section including at least two flat surfaces wherein at least one of the flat surfaces is configured to engage a surface of the rail. At least one of the first bracket and second bracket may include a C-shaped extension member fastened to one of the vertically flat surfaces of the rail. The first plate member or second plate member may be configured for mating engagement with a complementary plate member to form the first bracket or second bracket. The first plate member may include a bent configuration and the complementary plate member includes a bent configuration wherein the first plate member and complementary plate member are configured to be attached to one another along mating edges having mating members capable of mating engagement with one another. The mating members may include at least one tab configured to be placed in mating engagement with at least one notch. At least one of the first, second, third, and fourth mounting platforms may include a first mounting platform component capable of matting engagement with a second mounting platform component to form the mounting platform. The first mounting platform component may include a bent configuration and the second mounting platform may include a bent configuration wherein the first and second mounting platform components are configured to be attached to one another along complementary edges having mating members capable of mating engagement with one another. The mating members may include at least one tab configured to be placed in mating engagement with at least one notch. The first mounting platform includes a plate member having an aperture to support the receiving member therein. The first mounting platform may include a plate member having an aperture to support the receiving member therein and wherein the mounting platform components may include mating slots for receiving and supporting tabs of the plate member. At least one of the first receiving member, the second receiving member, and the third receiving member may be adjustable in a longitudinal, transverse, and vertical direction relative to the bracket.

In another embodiment, provided is an under bed mounting apparatus to attach at least one receiving member to a load bed of a vehicle. The apparatus may comprise a bracket formed with a first plate member and a second plate member wherein the first plate member is matingly attached to the second plate member. At least one receiving member positioned in an aperture of a mounting platform, wherein the mounting platform is attachable to the bracket and includes a first bent mounting platform component and a second bent mounting platform component. The receiving member may be a mounting point for a vehicle accessory. The first plate member and second plate member may be configured to be attached to one another along mating edges having mating members capable of mating engagement with one another. The mating members may include at least one tab configured to be placed in mating engagement with at least one notch. The first mounting platform component may include a bent configuration and the second mounting platform includes a bent configuration wherein the first and second mounting platform components are configured to be attached to one another along complementary edges having mating members capable of mating engagement with one another. The mounting platform may include a plate member having an aperture to support the receiving member therein and wherein the mounting platform components includes mating slots for receiving and supporting tabs of the plate member.

A method of creating an integral hitch mounting apparatus on a vehicle frame comprising the steps of providing a first receiving member and a second receiving member; providing a first plate member and a complementary plate member; providing a plurality mounting platform components; forming the plurality of mounting platform components into a first mounting platform and a second mounting platform, wherein the first mounting platform and the second mounting platform each include an aperture configured to receive one receiving member; attaching the first plate member to the complementary plate member to form a first bracket; attaching the first mounting platform and the second mounting platform to the first bracket; attaching a receiving member to the first mounting platform and a receiving member to the second mounting platform; and attaching the first bracket to a rail positioned under a bed of a vehicle. Additionally, the method may comprise the steps of providing at least one receiving member; providing a second plate member and a second complementary plate member; providing a plurality of mounting platform components; forming the plurality of mounting platform components in to a third mounting platform wherein the third mounting platform includes an aperture configured to receive a receiving member therein; attaching the second plate member to the second complementary plate member to form a second bracket; attaching the third mounting platform to the second bracket; attaching one receiving member to the third mounting platform; and attaching the second bracket to a rail positioned under a bed of a vehicle in an offset arrangement relative to the first bracket wherein the receiving members of the first bracket are not spaced in a square or rectangular configuration relative to the receiving members of the second bracket. The mounting platforms may be disposed on opposing transverse sides of the bracket.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the present teachings may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the present teachings as if fully rewritten herein. All values or measurements (whether shown or discernible from the drawings), as well as ratios that may be inferred between any set of such values, are incorporated as part of this written disclosure.

In the drawings:

FIG. 3A is a perspective view of an embodiment of a bracket with two receiving members according to the instant application.

FIG. 3B is a perspective view of an embodiment of the brackets each with two receiving member according to the instant application.

FIG. 4A is a perspective view of another embodiment of the bracket with two receiving members according to the instant application.

FIG. 4B is a perspective view of an embodiment of a bracket with two receiving members according to the instant application.

FIG. 5A is a perspective view of another embodiment of the bracket with two receiving members according to the instant application.

FIG. 5B is a perspective view of an embodiment of a bracket according with two receiving members according to the instant application.

FIG. 6 is a sectional, three dimensional perspective view of an alternative embodiment of the bracket according to the instant application.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

With reference to the Background section above, the configuration of mounting points created by conventional vehicle apparatus mounting systems usually produces a square or rectangular pattern, with each mounting point situated in a corner of the quadrilateral. However, both the structural components of vehicles (e.g., the vehicle frame) and the systems attachable to vehicles (e.g., towing apparatus or other accessories mounted to and carried in the vehicle load bed) have evolved. In some instances, it may no longer be feasible or preferred to rely on a conventional rectangular configuration. Such accessories contemplated for mounting to the disclosed assembly may comprise, without limitations, bike racks, baskets, grills, tables, storage racks, tool boxes, boxes, or any other type of apparatus configured to be placed on the load bed of a towing vehicle.

Figure 1:
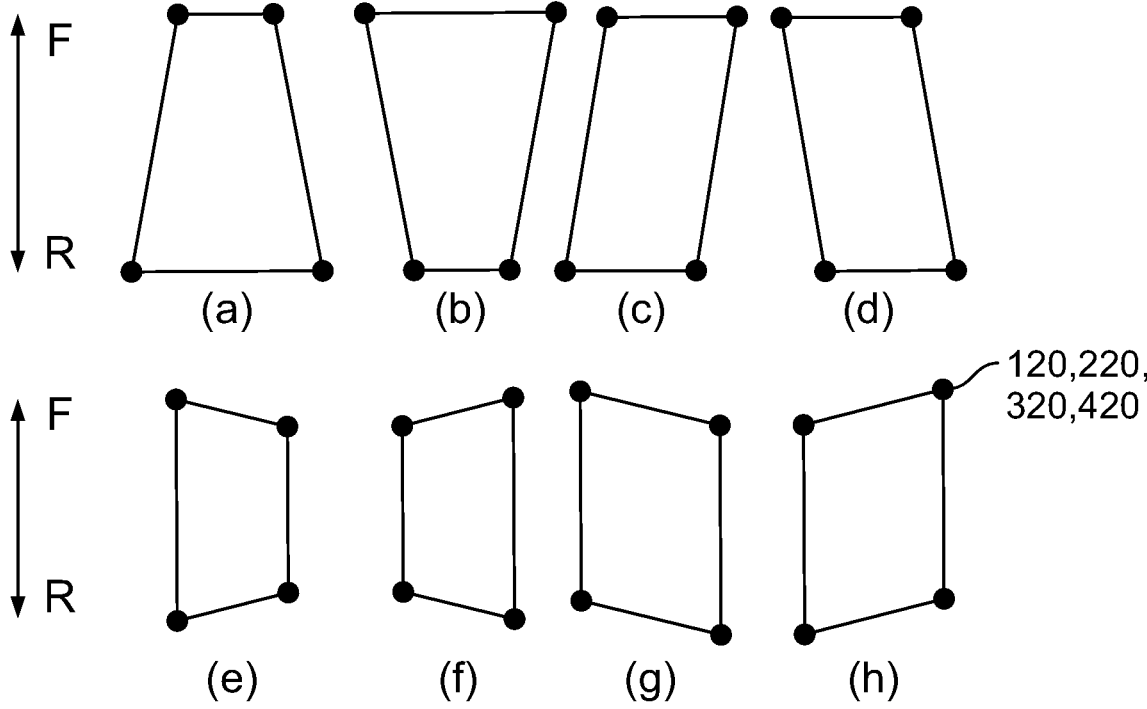
FIG. 1 (*a*) through (*h*) are a series of schematic views of offset, quadrilateral arrangements of the connection pucks (receiving members) according to certain aspects of the present disclosure, with F indicating the forward direction of the vehicle load bed and R indicating the rear in all configurations shown.
Figure 2A:
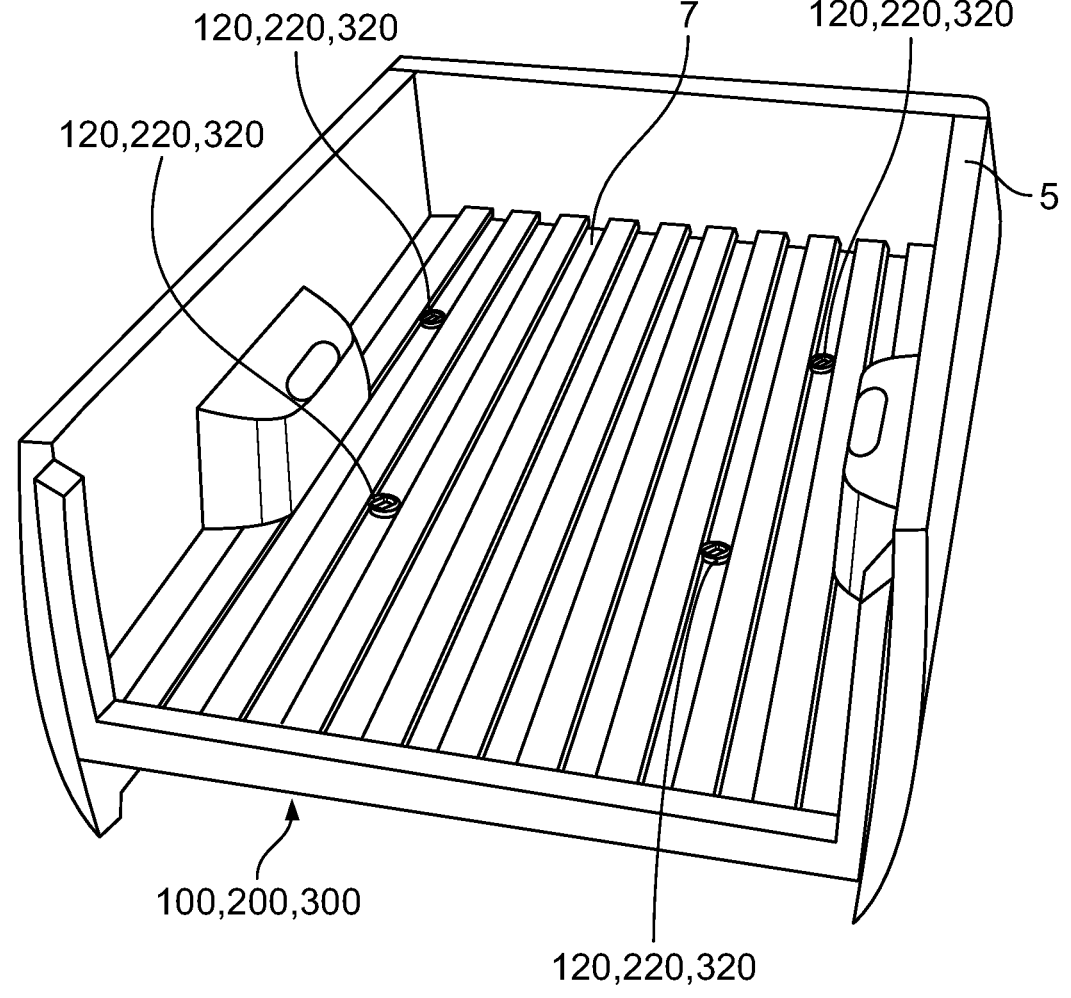
FIG. 2A is a three dimensional plan views of a towing vehicle 5 to highlight the relative positioning of the receiving members 120, 220, 320 in the load bed 7 according to one embodiment disclosed herein.
Figure 2B:
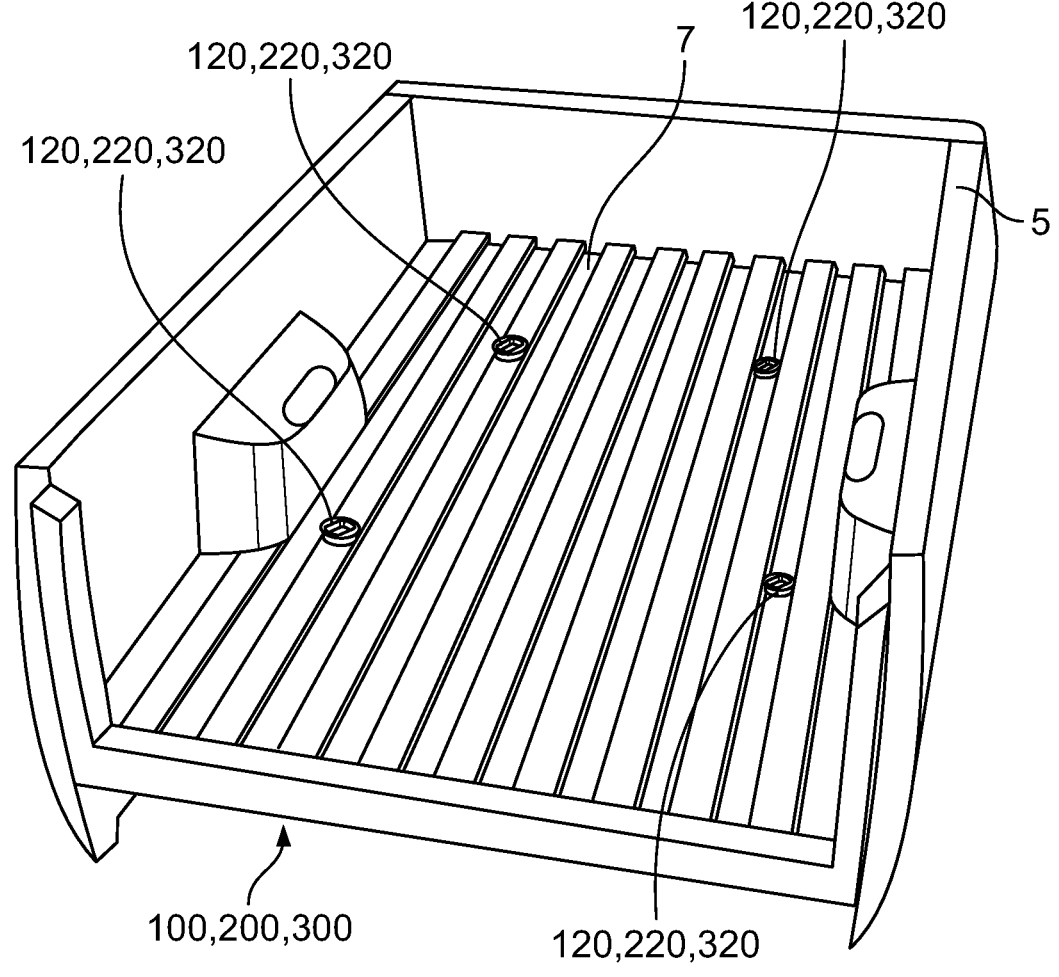
FIG. 2B is a three dimensional plan views of a towing vehicle 5 to highlight the relative positioning of the receiving members 120, 220, 320 in the load bed 7 according to one embodiment disclosed herein.

According, as shown schematically in FIGS. 1(*a*)-1(*h*) and illustrated in more detail in FIGS. 2A and 2B, an underbed mounting system is envisioned with an offset arrangement of mounting points (receiving members) 120, 220, 320. The offset arrangements of receiving members 120, 220, 320 as illustrated by the shapes in FIGS. 1(*a*)-1(*h*) may be considered "asymmetrical" as referred to herein. In particular, relative to the forward motion (i.e., the longitudinal axis of the vehicle), the mounting points are offset to form a parallelogram or a trapezoid. These arrangements will accommodate vehicle frames where the mounting rails do not or cannot accommodate the conventional shapes of previously known bed mounting systems.

FIGS. 1(*a*) and 1(*b*) illustrate forward and rearward facing trapezoid shaped offset arrangements of receiving members wherein the forward and rearward facing sides include a parallel configuration in general alignment relative to an edge of a towing vehicle (not shown) and wherein one parallel side includes a shorter length the other parallel side. FIGS. 1(*c*) and 1(*d*) illustrate forward and rearward facing parallelogram shaped offset arrangements of receiving members wherein the forward and rearward sides are in general alignment with an edge of a towing vehicle (not shown) and the generally parallel lengthwise sides are longer than the generally parallel forward and rearward sides. FIGS. 1(*e*) and 1(*f*) illustrate forward and rearward facing trapezoid shaped offset arrangements of receiving members wherein the forward and rearward lines are in a generally angled alignment relative to an edge of a towing vehicle (not shown) while the lengthwise sides are in a general parallel configuration with one another wherein a first lengthwise side is generally longer than the other. FIGS. 1(*g*) and 1(*h*) illustrate forward and rearward facing parallelogram shaped offset arrangements of receiving members wherein the forward and rearward sides are in a generally parallel arrangements relative to one another and are in a generally angled alignment relative to an edge of a towing vehicle (not shown) while the lengthwise sides are in a general parallel configuration with one another. Notably, other sized offset type of configurations are contemplated by this disclosure that include three, four or more receiving members, and this disclosure is not limited to merely those shown or described herein.

With reference to FIGS. 3A through 5B, the system may comprise a pair of brackets 104, with the first or left bracket and second or right bracket 104 similar so that the description of one may be applied to both brackets accordingly. Nevertheless, slight differences may exist between the brackets 104, such as through manufacturing tolerances, adjustments based on the frame to which the bracket attaches (e.g., a fastener may be positioned on the frame so that a slight variation in the one the brackets is required) and such other similar reasons, which are far too exhaustive to be included herein. Further, in some embodiments, the two brackets may be mirror images or may be identical. The selection of mirror image or identical can enable the patterns shown in FIGS. 1, 2A and 2B. FIGS. 3A, 3B, 4A, 4B, and 5A shows embodiments where the mounting platforms 110, 112, 310, 312 are on the same longitudinal side of the bracket 104, 302, whereas FIG. 5B is an example in which platform 110 is positioned on a transversely opposed longitudinal edge of the bracket 104.

As such, the brackets may be formed of steel or other appropriate metals and/or alloys and may be configured to be operatively positioned on opposing sides of a frame 6 of a towing vehicle. This arrangement eliminates the need to include any transverse member(s) between the brackets 104, and the left and right brackets are free from direct attachment between each other. In other words, there is no intervening component attached between or otherwise attaching them together, and they are independently attached to the frame 6 of the towing vehicle 5.

Four mounting platforms, with a pair of platforms 110, 112 formed on each of the two brackets 104. The platforms 110, 112 each accommodate a single receiving members 120, 220, 320 (described below) at longitudinally opposed ends of each bracket 104. These platforms can be generally perpendicular with the mounting brackets 102, 104, although there could be an angle between 80-110 degrees to the bracket 104 that is fitted around and received by the frame rail 6. These platforms 110, 112 may be added as weldments or as monolithic items (formed as a single item) that are cast, forged, or otherwise provided as a unitary part of the bracket 104. In some embodiments, the platforms may be integrated with the top surface of the bracket immediately above where it engages the rail 6 (a portion of which are shown in the drawings). The rail 6 may comprise a portion of the frame system of the towing vehicle.

A receiving member 120, such as a direct-to-puck receptacle, quick disconnect, or other similar connection port, are disposed on or integrated with the platforms 110, 112. The receiving member 120 may include the puck described in U.S. Pat. No. 7,121,537, which is hereby incorporated by reference. This results in the under bed hitch mounting apparatus 100 having four receiving members 120. When the brackets 104 are affixed to the longitudinal box rails 6 of the vehicle, the receiving member 120 may generally align with apertures formed in the truck or load bed 7 of the vehicle 5.

Generally speaking, the mechanism 120 cooperates with a corresponding towing component(s), such as a leg of a fifth wheel receiver platform, an above-bed hitch mounting mechanism, safety chain tie down member, or other similar items as well as other accessory carrying devices, e.g., bike racks, baskets, cargo carriers, etc. Examples of the mounting mechanism are disclosed in U.S. Patent Publication No. 2017/0182855 (now U.S. Pat. No. 10,479,153), which is incorporated herein by reference. In such embodiments, the under bed hitch mounting apparatus 100 may include four receiving members 120, which may be positioned in four corresponding apertures in the load bed 7 of the towing vehicle 5. The receiving members 120 may generally hide the apertures in the load bed 7 when the under bed mounting apparatus 100 is operatively installed.

Brackets 104 may be formed in a generally inverted U-shape. In this manner, three generally flattened surfaces may be spaced to engage the longitudinal rails 6. In some aspects, the downward extending legs 122, 126 of the U-shaped brackets 102, 104 can protrude beyond the bottom edge of the rails 4, 6 so that a fastener may attach along the bottom (not shown). Additional fasteners or adhesives (not shown) may be disposed on, in, or between the rail and the bracket to improve engagement. Still further, the U-shaped brackets 104 may be welded to the longitudinal rails 6. Specifically, a front portions on one or both legs 122, 126 and/or a top portion 140, 146 may be welded to otherwise attached with the rails 6.

A portion 113 of the bracket 104 may be open along its top facing to reduce material use. Thus, only midpoint connections beams 114 maintain connection and spacing of the mounting platforms and, by extension, the receiving members 120, 220, 320. The midpoint connection beams 114 may also be welded and/or otherwise attached with the rail 6.

As seen in FIG. 5B, one or both brackets may be formed so that the mounting platforms are disposed on opposing transverse sides of the bracket. When straight, parallel frame rails are employed in the vehicle 5, this arrangement allows for parallelogram-type arrangements (when brackets 104 are identical) or trapezoid-type arrangements (when brackets 104 are mirror images).

Additional embodiments of an under bed hitch mounting apparatus according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired under bed hitch mounting apparatus without departing from the spirit and scope of the present teachings.

In another embodiment shown in FIG. 6, the mounting platform for the receiving member 220 may be integrally formed on the top flattened section of member 206. A vertical side wall 233 of the member 206 (as shown for bracket 204) may include apertures 235 or other attachment points for a generally C-shaped side extension bar 208. Extension bar 208 may be formed to engage C-frame longitudinal rail 8 (analogous to rail 6 above, but with an open and/or hollow section exposed, thereby creating a challenge in fitting, mounting, and connecting the bracket 204 to the rail 8). Although, the mounting platform for receiving member 220 may be utilized with any under bed frame rail or frame member. The horizontal, transversely extending legs 243 of the extension bar 208 may include optional adjustable fasteners 209, such as a nut and/or screw fitting, to allow for a gap between a portion of the bracket 202, 204 and its corresponding rail 8.

In this manner, the necessary spacing for the receiving members 220 can be maintained relative to one another even when the rails 8 may not be perfectly parallel or do to other tolerance issues. Extension bars 208 may be fastened or attached to the rails 8 independently from their connection to the brackets or dependent thereupon. Additionally or alternatively, this approach provides a further degree of freedom to create the desired offset arrangement described above.

Member 206 is shown as a continuous polygonal tube with four major, flat surfaces. However, portions of one or more surfaces of the member 206 may be removed. It is also possible to incorporate member 206 with only two or three major surfaces (e.g., a transversely disposed L-, C-, or U-shape). The member could also be formed as an I- or a T-beam. Protruding mounting platforms could also be incorporated.

Figure 7:
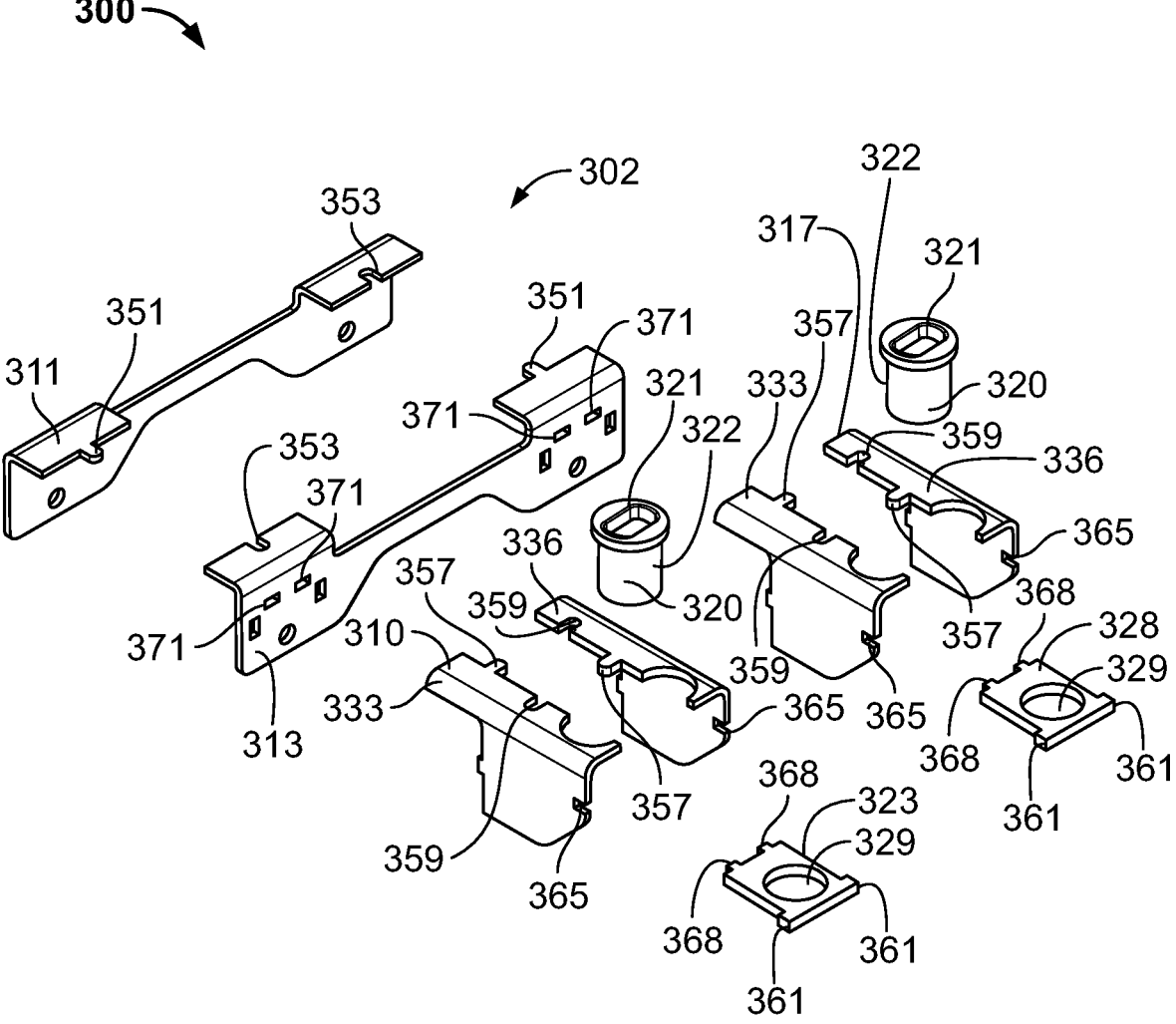
FIG. 7 is an exploded view of an embodiment of an embodiment of the bracket according to the instant application.
Figure 8:
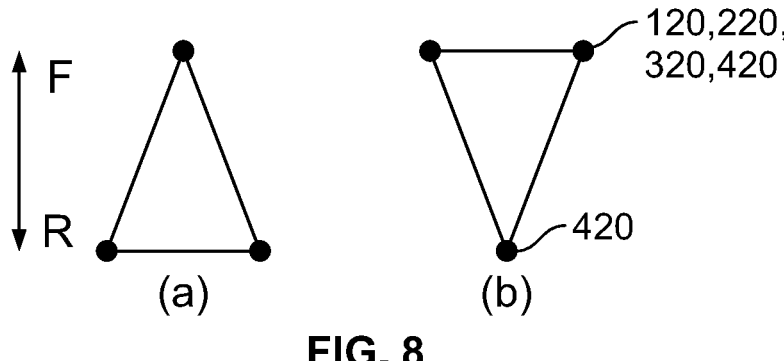
FIGS. 8 (*a*) and (*b*) are schematic views of triangular arrangements of the connection pucks (receiving members) according to certain aspects of the present disclosure, with F indicating the forward direction of the vehicle load bed and R indicating the rear in all configurations shown.
Figure 9A:
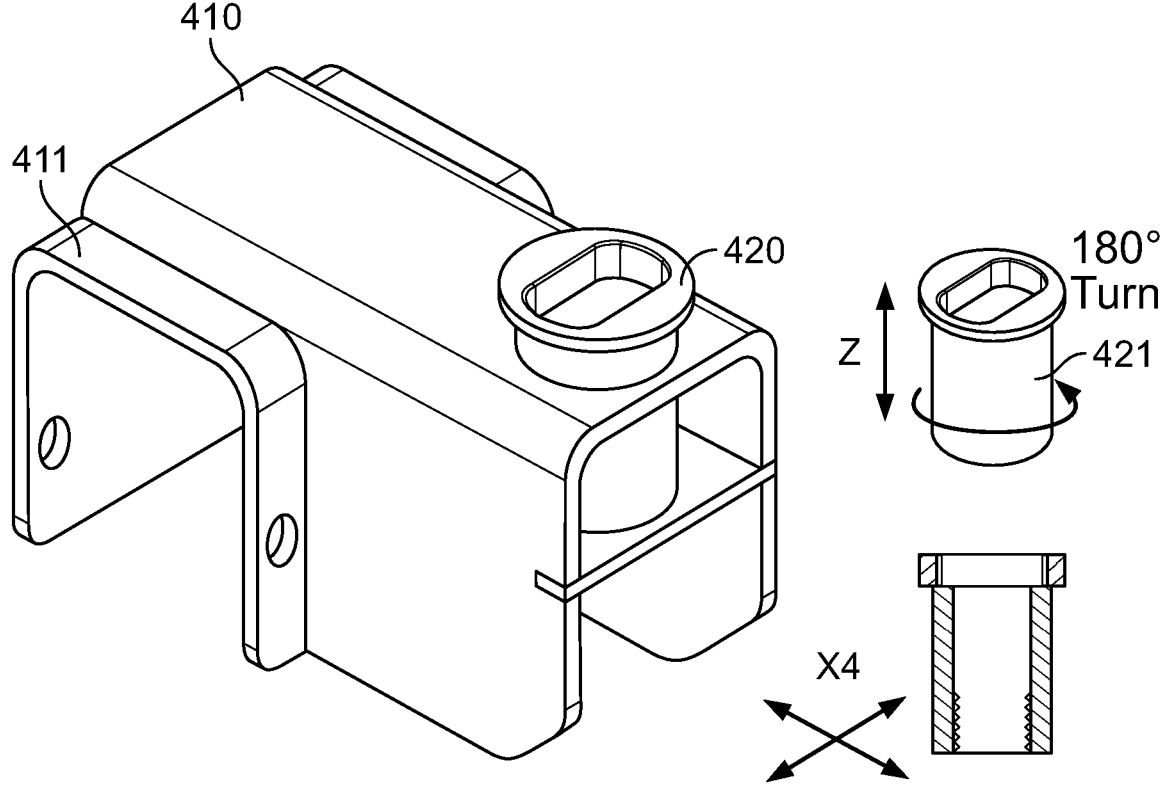
FIG. 9A is a schematic perspective view of an alternative embodiment of the bracket according to the instant application.
Figure 9B:
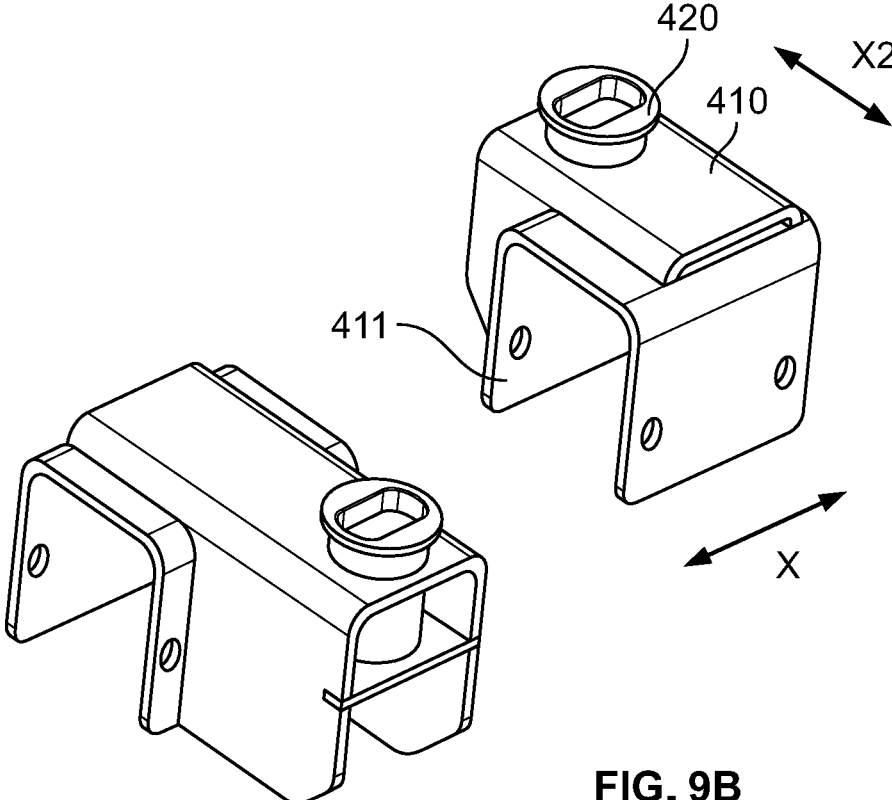
FIG. 9B is a schematic perspective view of an alternative embodiment of the bracket according to the instant application.
Figure 9C:
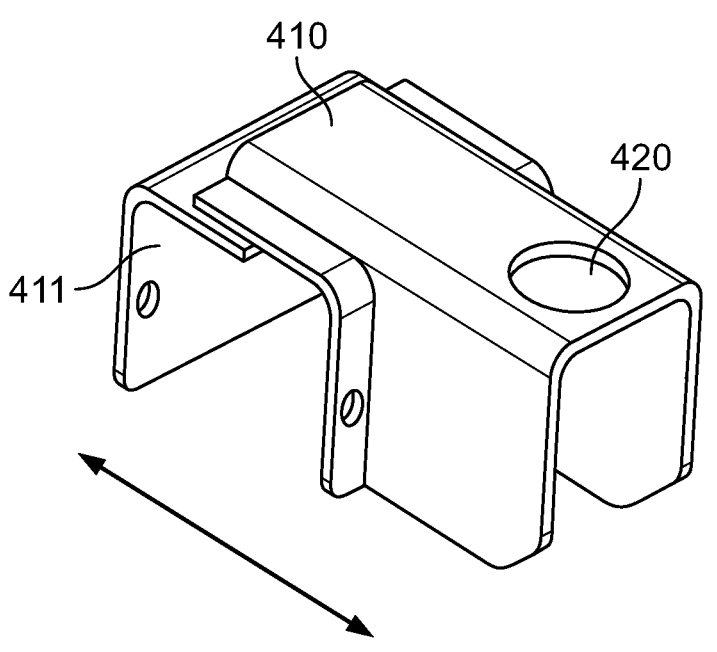
FIG. 9C is a schematic perspective view of an alternative embodiment of the bracket according to the instant application.

The embodiment of FIG. 3A is shown in exploded view as mounting apparatus 300 is shown in FIG. 7. In this embodiment, the under bed hitch mounting apparatus 300 may include a left or first bracket 302 and second or right bracket (not shown for sake of brevity, but contemplated hereby). However, it will be understood that the arrangement shown in FIG. 4B can be attained simply by reversing the positioning of the attachment points and mechanisms in the sidewalls at one end of bracket 302 in comparison to the other. Further, an individual bracket 411 that may carry a single mounting member 420 as described in more detail and illustrated by FIGS. 9A, 9B, and 9C is contemplated to also include similar features as the bracket 302 and components illustrated by explode view in FIG. 7.

The brackets 302 may be formed from two separate components 311 and 313, which may make manufacture thereof easier. In such embodiments, the two separate components 311, 313 may be formed separately and then welded together to form the brackets 302 (or may be attached in any appropriate manner). The two separate components 311, 313 may comprise first and second plate members 311, 313 that are bent into the appropriate configuration as shown for example in FIG. 7. Each or one of the brackets 302 may be formed in this manner. Each component or side 311, 313 may include mating members 351 and 353 capable of mating engagement with one another. An exemplary embodiment of such is shown in FIG. 7 as tabs 351 and notches 353. While a generally half-oval shaped tab and notch are shown, the present teachings contemplate any kind of matingly engaging components, e.g., semi-circular tab and notch, square tab and notch, rectangular tab and notch, etc. The mating members 351 and 351 help position the components 311, 313 in an operative position so that they may be welded or otherwise attached together. While one of the components 311 is shown as having one tab 351 and one notch 353 and the other component is similarly shown with one tab 351 and one notch 353, the present teachings are not limited to this configuration. Any number of mating members 351, 353 may be utilized with each of the components 311, 313. For example, there could be one set of mating members 351, 353, two as shown, three, four, five, etc. In some embodiments, one of the components 311 may include only mating 351 while the other component 313 may include only mating members 353. The components 311, 313 may have a mix where they each contain mating members 351 and 353 or component 311 may only contain mating members 353 and component 313 may only contain mating members 351. Any variation of these configurations is contemplated hereby.

The under bed hitch mounting apparatus 300 may comprise mounting platforms 310, 312, which may be similar to mounting platforms 110, 112. The mounting platforms 310, 312 may be formed similar to the brackets 302, i.e., they may be formed from two mounting platform components 333, 336, whereby there are a total of four such mounting platforms 310, 312. The two mounting platform components 333, 336 of each mounting platform 310, 312 may be of a generally similar configuration. The mounting platform components 333, 336 may each comprise mounting platform plate members that are bent into mating shapes, such as those shown in FIG. 7. There may be four such mounting platform plate members 333, 336. These mounting platform components 333, 336 may include platform mating members 357 and 359 capable of mating engagement with one another. An exemplary embodiment of such is shown in FIG. 7 as tabs 357 and notches 359. While a generally half-oval shaped tab and notch are shown, the present teachings contemplate any kind of matingly engaging components, e.g., semi-circular tab and notch, square tab and notch, rectangular tab and notch, etc. The platform mating members 357 and 359 help position the mounting platform components 333, 336 in an operative position so that they may be welded or otherwise attached together. While both of the mounting platform components 333, 336 is shown as having one tab 357 and one notch 359, the present teachings are not limited to this configuration. Any number of mating members 357, 359 may be utilized with each of the mounting platform components 333, 336. For example, there could be one set of mating members 357, 359, two as shown, three, four, five, etc. In some embodiments, one of the mounting platform components 333, 336 may include only mating 357 while the other of the mounting platform components 333, 336 may include only mating members 359. The mounting platform components 333, 336 may have a mix where they each contain mating members 357 and 359 or one of the mounting platform components 333, 336 may only contain mating members 359 and the other of the mounting platform components 333, 336 may only contain mating members 357. Any variation of these configurations is contemplated hereby.

Mounting platforms 310, 312 may be formed at longitudinally opposed ends of each of the brackets 302. A total of four mounting platforms 310, 312 may be utilized on the brackets 302, i.e., each mounting bracket 302 may include a pair of mounting platforms 310, 312. These platforms 310, 312 may be added as weldments or otherwise attached such as through fastening.

The under bed hitch mounting apparatus 300 may comprise a plurality of receiving members 320, such as a direct-to-puck receptacle, quick disconnect, or other similar connection port to attach thereto other accessories such as a leg of a fifth wheel hitch, safety chain tie down device or an accessory attachment device. The receiving members 320 may all be of substantially identical construction save for certain manufacturing tolerances or specific design choices. The receiving members 320 may be disposed on or integrated with the platforms 310, 312. By way of a non-limiting example, the under bed hitch mounting apparatus 300 may have four receiving members 320.

When the brackets 302 are affixed to the longitudinal box rails of the vehicle, the receiving member 320 may generally align with apertures formed in the truck or load bed 7 of the towing vehicle 5 as indicated in FIGS. 1, 2A, and 2B above. Generally speaking, the receiving member 320 cooperates with a corresponding towing component(s), such as a leg of a fifth wheel receiver platform, an above-bed hitch mounting mechanism, safety chain tie down member, or other similar items. As shown, the receiving member 320 may comprise a slotted opening 321 with a generally tubular body 322 extend from the slotted opening 321. Any kind of locking or engaging device may be included within the tubular body 322 to engage and lock a corresponding locking device. Examples of which are disclosed in U.S. Pat. No. 7,121,573, which is hereby incorporated by reference. The slotted opening 321 may be configured to accept a leg of a fifth wheel hitch, an above-bed hitch mounting mechanism, safety chain tie down member, or other similar items.

The receiving member 320 may include plate member 323 which may be attached between the mounting platform components 333, 336. In some embodiments, the plate member 323 may include an aperture 329 through which the tubular body 322 may pass and to which may be attached the tubular body 322. In some embodiments, the plate member 323 may be welded to each of the mounting platform components 333, 336 and the tubular body 322. Alternatively or in addition, the plate member 323 may be fastened to each of the mounting platform components 333, 336 and the tubular body 322. Said aperture 329 in plate member 323 may be generally aligned with an aperture 339 formed in mounting platforms 310, 312. The apertures 329 and 339 may be configured to receive and support the receiving members 320 therein. Further, the mounting platforms 310, 312 may allow for rotation of the receiving members 320 or allow for the receiving members to have axial adjustment along the axis of the aligned apertures 329, 339.

In some embodiments, the plate member 323 may include tabs 361 that extend therefrom. The plate member 323 may include a pair of tabs 361 as shown or may include any number of such. The tabs 361 may be configured to engage mating slots 365 in the mounting platform components 333, 336. The engagement of the tabs 361 with the slots 365 may put the plate member 323 in an operative position relative to the mounting platform components 333, 336. While it is shown that the tabs 361 are on the plate members 323, the present teachings are not limited to such. The opposite may be true, the tabs 361 may be on the mounting platform components 333, 336 and the slots 365 positioned on the plate members 323. Further, while the tabs 361 and slots 365 are shown, any kind of mating engagement members may be utilized without departing from the present teachings.

Further, the plate members 323 may include a second set of tabs 368 that may be configured to engage corresponding slots 371 positioned on at least one of the two components 311, 313. While shown specifically on component 313, the slots 371 could be found on component 311 or on both. In such example, the tabs 368 could be of a size to extend through the slots 371 in the component 313 into slots in the component 311. Alternatively, the tabs 368 may merely engage the slots 371 in component 311. This may further allow the plate members 323 to be operatively positioned with respect to the component 313 in advance of being welded thereto.

In use, the under bed hitch mounting apparatus 300 may be attached to the frame or a portion of the frame, e.g., the rails of a towing vehicle. The under bed hitch mounting apparatus 300 may comprise two mounting brackets 302 (despite only one being shown, the corresponding one would be substantially identical). The under bed hitch mounting apparatus 300 may be positioned such that the receiving member 320 are aligned with openings in the bed of the towing vehicle (or openings may be formed over the receiving members 320). An accessory member, such as for example, a fifth wheel hitch may then be operatively attached in any appropriate manner. For example, legs of a fifth wheel hitch or other accessory device may be positioned in relation to the receiving members 320 (or more specifically, the oval openings 321) and a locking device may selectively lock the legs or other accessory attaching device with the receiving members 320 or more specifically to the under bed hitch mounting apparatus 300 so that the towing vehicle is ready to two a fifth wheel hitch device such as a trailer.

Normally, in any of the illustrated embodiments above, only two brackets are needed to accomplish mounting of most towing components. Nevertheless, additional brackets could be added for components requiring an even greater number of connection points. In all instances, the lack of transverse rails along the underside of the vehicle improves the overall clearance/profile for that vehicle. Thus, the receiving members 120, 220, 320 may generally hide the apertures in the load bed 7 when the under bed mounting apparatus is installed.

Whereas conventional approaches expect perfect transverse alignment of the receiving members 120, 220, 320 in order to form right angles, the offset arrangements contemplated herein allow for the brackets to be staggered along the longitudinal axis. In the event the vehicle has transverse cross members (e.g., frame rails) positioned proximate to the load bed or other connection point on the vehicle, it may also be possible to align the brackets transversely, either staggering the positioning in the transverse angle or using a pair of brackets where the distance between mounting platforms 110, 112, 310, 312 on the first bracket is smaller than that on the second bracket. This approach of using two different brackets having varying distance between the platforms (and, by extension, the receiving members) would also be effective in creating offset arrangements even when the frame or rails are oriented in a conventional, longitudinal manner. Finally, for vehicles with angled rails (relative to the longitudinal axis/direction of travel for the vehicle), the use of identical brackets would still create an offset arrangement as dictated by the orientation of the angled frame/rails.

Further, there is no need for the bracket to include two separate mounting members 120, 220, 320. Instead, as illustrated in FIGS. 9A, 9B, and 9C, individual brackets 411 may carry a single mounting member 420. In this manner, single point attachments can be provided along virtually any vehicle rail, with each bracket 411 provided independently at any desired position within the load bed. As such, bracket 411 enables configurations in triangular, three point mounting systems, as well as four, five or more points—further expanding the system well beyond the known rectangular shapes and systems described above. Notably, bracket 411 and/or mounting member 420 can be constructed in a manner similar to any of the components disclosed and depicted herein. Notably, this disclosure also contemplates that two, three, or more single brackets 411 may be mounted along a common side of a rail or may be mounted along staggered opposing sides of a common rail.

Also, with reference to FIG. 9A, mounting platform 410 with receiving member 420 may be threaded to cooperate with and attach to the bracket 411. Notably, all of the receiving members in any of the described assemblies herein may include a threaded configuration for attachment to the bracket 411. Alternatively, appropriate vertical adjustment fitting may be provided within receiving member 420 itself. In either instance, by rotating or slibably adjusting and locking the elevation in the vertical direction (i.e., z axis), it becomes possible to create mounting systems with three independent degrees of freedom (i.e., x, y, and/or z axes). In this manner, yet other arrangements can be attained without being unduly confined by the cross members or other constraints inherent to prior art systems.

To the extent the elevation of receiving member 420 may be adjusted relative to mounting platform 410 by rotating along a threaded connection, the member as shown would need to be confined to adjustments based upon 180 degrees to ensure alignment of the connection mechanism itself. However, the member 420 could be provided with a further locking mechanism 421 to allow for incremental adjustments of less than 180 degrees my permitting selective adjustment and locking of the member 420 relative to the socket in which it attaches to bracket 411. As above, this z-axis adjustment may be applied to any of the other members 120, 220, 320 disclosed herein.

Whether provided as a bracket with one or two mounting members, the illustrated connection to the frame is shown as nesting atop a beam on the vehicle frame (i.e., in an "n" type engagement). However, it is possible to make these attachments along either vertical side of the beam (i.e., a "c" type engagement) or to even connect to the bottom of the beam (i.e., a "u" type engagement). Any one or combination of these engagements can be employed, thereby offering additional degrees of freedom in locating the attachment points and, ultimately, forming the unique arrangements and shapes shown in FIGS. 1(a) through 1(h) for a four receiving member connection or as shown by the triangular orientation of FIGS. 8(a) and 8(b) for a three receiving member connection. By way of a non-limiting example, the under bed hitch mounting apparatus 100, 200 and 300 of the present disclosure may comprise three or four mounting points (such as 120, 220 and 320). In such embodiments, the location and configuration of the mounting points may form any appropriate shape, examples of which are shown in FIGS. 1(a) through 1(h) and FIGS. 8(a) and 8(b). Further, while four such mounting points are shown in the drawings, three five, six, or more mounting points may also be utilized.

In those embodiments in which three mounting points are utilized, those may be in any appropriate configuration, e.g., triangular, etc. For example, one mounting point may be on one side of the towing vehicle while two mounting points are on the other side. When two mounting points are utilized, those two mounting points may be on a single attachment member attached to the frame or the like or may be on separate attachment members each attached to the frame as described above. It should be understood further, that the under bed hitch mounting apparatus 100, 200, 300, and 400, regardless of the number of mounting points utilized, may comprise a single body member whereby all of the attachment points are attached, two body members whereby one attachment point is attached to a first body member and three are attached to a second body member. Similarly, the under bed hitch mounting apparatus 100, 200 and 300 may utilize two body members whereby two mounting points are attached to each. Further still, the under bed hitch mounting apparatus 100, 200 and 300 may comprises three body members whereby one mounting point is attached to two of the body members and two mounting points may be attached to a third body member. Further still, the under bed hitch mounting apparatus 100, 200 and 300 may comprise four body members whereby each body member may include a hitch mounting system attached thereto. It should be understood that the body members may be of any configuration described above. They may be attached with the frame of the towing vehicle, such as through fasteners, welding or being integrally formed therewith.

The mounting points may be inboard or outboard of the frame members of the towing vehicle. That is, the body members may be attached to either side of the frame members are not limited to just those configurations shown herein.

In the same manner, any of the receiving members shown herein can be provided on the same or opposing sides of a beam (whether using separate brackets or formed as part of the same bracket). Here again, this provides another degree of design freedom in attaining the shapes contemplated herein.

Further still, virtually all of the brackets may be fastened to the vehicle frame, such as with fasteners, U-bolts or the like. It will be understood that these fasteners may completely penetrate the frame walls and even be received in the mounting structure on the opposing side (i.e., the fastener attaches to the bracket on opposite sides of the frame rail). In this manner, additional shear strength can be attained. Further, a plurality of fasteners may be used to further improve shear strength. Further still, utilizing fasteners or U-bolts may allow the location of the mounting points 120, 220, 320 or more specifically, the pucks to be adjustable. This would allow for adjustability of the mounting points 120, 220, 320 in the X, Y and Z directions for the fifth wheel hitch to attach to the towing vehicle. In such embodiments, the adjustability in the X direction may comprise longitudinal slots in the frame attachment, the adjustability in the Z direction may comprise vertical height adjustment via threaded puck, detent, slip cylinder and/or clamping mechanism, and the adjustability in the Y direction may comprise a transverse slip plane bracket that is adjustable. It should be understood that these are merely exemplary embodiments and that the adjustability may be done through any appropriate mechanism.

A further possibility is to embed, attach, or stamp the mounting platforms and/or receiving members directly within the frame or rails themselves in order to attain an offset arrangement. Here, there would be no need to create separate brackets for attachment and, instead, the offset arrangement is simply dictated by the orientation of the frame/rails. In these embodiments, the mounting platforms and/or receiving members may be vertically directly attached into the frame or through the towing vehicle from rail with a mounting puck attached to the frame.

Accordingly, a method of making an integral, offset mounting system for a vehicle is contemplated. The method includes providing or forming a series of three, four, or five separate receiving members in an offset arrangement. The forming step may include embedding, stamping, forging, casting, or assembling a rail to incorporate receiving members 120, 220, 320, 420. The positioning of the rails as the vehicle itself is assembled will, in turn create an offset arrangement. As an optional step, the vehicle load bed or some other adapting member may be provided to attach to the offset receiving members but then connect to the towing apparatus or vehicle accessory positioned within the load bed according to some other configuration.

One benefit of either or both of the under bed hitch mounting apparatuses described above is that they can be operatively attached to the frame of the vehicle without the need for any kind of cross rail member or other transversely extending device or member. In other words, the brackets 102, 104 (202, 204 and 302) may be attached to the frame of the towing vehicle 5 without needing an intervening transverse member or cross rail type member attaching the two brackets 102, 104 (202, 204 and 302 and its other bracket) directly together. Other prior art versions require a cross rail (i.e., a rail extending transversely across the vehicle or stated another way extending perpendicular to the direction of travel of the towing vehicle). For those vehicles that do not have room for a cross rail or other similar transversely extending device to be positioned below the load bed of the vehicle, the under bed hitch mounting apparatus 100, 200 and 300 can be used to provide an under bed hitch mounting apparatus to which a fifth wheel hitch or similar device may be operatively attached.

The mounted device, such as a hitch, may include any kind of locking device, an example of which is disclosed in U.S. Pat. No. 7,121,573. In these embodiments, the legs include an aperture through which the locking device is received, with a corresponding receiving member accessible from the load bed of the vehicle. The locking device may be rotated to selectively securing the locking device to the receiving member.

It will, of course, be understood that the towing or vehicle accessory connected to the receiving members 120, 220, 320 itself must be configured in a similar offset manner.

Although the present embodiments have been illustrated in the accompanying drawings and described in the foregoing detailed description, it is to be understood that the present teachings are not to be limited to just the embodiments disclosed, and numerous rearrangements, modifications and substitutions are also contemplated. The exemplary embodiments have been described with reference to the preferred embodiments, but further modifications and alterations encompass the preceding detailed description.

These modifications and alterations also fall within the scope of the appended claims or the equivalents thereof

What is claimed is:

1. An under bed mounting apparatus to create an offset arrangement of receiving members in a vehicle load bed comprising:

a first bracket including a first receiving member positioned in a first mounting platform and a second receiving member positioned in a second mounting platform, wherein the first mounting platform and the second mounting platform are attachable to one another along a first plate member; and a second bracket including at least one of a third receiving member positioned in a third mounting platform and a fourth receiving member positions in a fourth mounting platform, wherein:

the first bracket and the second bracket are configured to be attached to a rail of a frame of the vehicle, at least one of the first receiving member, the second receiving member, the third receiving member or the fourth receiving member is axially adjustable relative to the first or the second bracket, at least one of the first, second, third, and fourth mounting platforms include a first mounting platform component capable of mating engagement with a second mounting platform component to form the mounting platform, the first mounting platform component includes a bent configuration and the second mounting platform includes a bent configuration, and wherein the first and second mounting platform components are configured to be attached to one another along complementary edges having mating members capable of mating engagement with one another, and the first or second mounting platform includes mating slots for receiving and supporting tabs of the plate member.

2. The under bed mounting apparatus of claim 1, wherein the first and second brackets are attached to the vehicle frame by bolt, weld, or cast and wherein the first and second brackets are at least mounted partially around the rails.

3. The under bed mounting apparatus of claim 1, wherein the receiving members include mounting points that are configured to accept quick disconnect direct-to-puck assemblies.

4. The under bed mounting apparatus of claim 1, wherein at least one of the first bracket and second bracket is formed from a completely or partially enclosed tube or beam with a polygonal transverse cross section including at least two flat surfaces wherein at least one of the flat surfaces is configured to engage a surface of the rail.

5. The under bed mounting apparatus of claim 1, wherein at least one of the first bracket and second bracket includes a C-shaped extension member fastened to one of the vertically flat surfaces of the rail.

6. The under bed mounting apparatus of claim 1, wherein the first plate member is configured for mating engagement with a second plate member to form the first bracket or second bracket.

7. The under bed mounting apparatus of claim 6, wherein the first plate member includes a bent configuration and the complementary plate member includes a bent configuration, and wherein the first plate member and complementary plate member are configured to be attached to one another along mating edges having mating members capable of mating engagement with one another.

8. The under bed mounting apparatus of claim 7, wherein the mating members include at least one tab configured to be placed in mating engagement with at least one notch.

9. The underbed mounting apparatus of claim 1, wherein the mating members include at least one tab configured to be placed in mating engagement with at least one notch.

10. The under bed mounting apparatus of claim 1, wherein the first mounting platform includes a plate member having an aperture to support the receiving member therein.

11. An under bed mounting apparatus to attach at least one receiving member to a load bed of a vehicle comprising:

a bracket formed with a first plate member and a second plate member wherein the first plate member is matingly attached to the second plate member; and at least one receiving member positioned in an aperture of a mounting platform, wherein the mounting platform is attachable to the bracket and includes a first bent mounting platform component and a second bent mounting platform component, wherein:

the receiving member is a mounting point for a vehicle accessory, and the first and second plate members are configured to be attached to one another along mating edges having mating members capable of engagement with one another, the mating members including at least one tab configured to be placed in mating engagement with at least one notch.

12. The under bed mounting apparatus of claim 11, wherein the bracket includes mating slots for receiving and supporting tabs of the plate member.

13. An under bed mounting apparatus to create an offset arrangement of receiving members in a vehicle load bed comprising:

a first bracket including a first receiving member positioned in a first mounting platform and a second receiving member positioned in a second mounting platform, wherein the first mounting platform and the second mounting platform are attachable to one another along a first plate member; and a second bracket including at least one of a third receiving member positioned in a third mounting platform and a fourth receiving member positioned in a fourth mounting platform, wherein:

the first bracket and the second bracket are configured to be attached to a rail of a frame of the vehicle, at least one of the first receiving member, the second receiving member, the third receiving member or the fourth receiving member is axially adjustable relative to the first or the second bracket, the first plate member is configured for mating engagement with a second plate member to form the first bracket or the second bracket, the first plate member includes a bent configuration and the second plate member includes a bent configuration, and wherein the first and second plate members are configured to be attached to one another along mating edges having mating members capable of mating engagement with one another, and the mating members include at least one tab configured to be placed in mating engagement with at least one notch.

14. An under bed mounting apparatus to create an offset arrangement of receiving members in a vehicle load bed comprising:

a first bracket including a first receiving member positioned in a first mounting platform and a second receiving member positioned in a second mounting platform, wherein the first mounting platform and the second mounting platform are attachable to one another along a first plate member; and a second bracket including at least one of a third receiving member positioned in a third mounting platform and a fourth receiving member positioned in a fourth mounting platform, wherein:

the first bracket and the second bracket are configured to be attached to a rail of a frame of the vehicle, at least one of the first receiving member, the second receiving member, the third receiving member or the fourth receiving member is axially adjustable relative to the first or the second bracket, at least one of the first, second, third, and fourth mounting platforms includes a first mounting platform component capable of mating engagement with a second mounting platform component to form the mounting platform, the first mounting platform component includes a bent configuration and the second mounting platform component includes a bent configuration, and wherein the first and second mounting platform components are configured to be attached to one another along complementary edges having mating members capable of mating engagement with one another, and the mating members include at least one tab configured to be placed in mating engagement with at least one notch.

* * * * *